United States Patent [19]

Woodmansee

[11] 3,794,434
[45] Feb. 26, 1974

[54] ATTACHMENT FOR OPERATING TOOL ACCESSORIES

[76] Inventor: John B. Woodmansee, 7632 Fall Creek Rd., Indianapolis, Ind. 46256

[22] Filed: May 5, 1972

[21] Appl. No.: 250,515

[52] U.S. Cl.............................. 408/56, 408/241
[51] Int. Cl.............................................. B23b 51/06
[58] Field of Search............ 408/241, 56, 59, 60, 61; 137/609

[56] References Cited
UNITED STATES PATENTS
1,196,572    8/1916    Maynard.............................. 408/61
  839,188   12/1906    Obertop............................... 137/609

Primary Examiner—Andrew R. Juhasz
Assistant Examiner—William R. Briggs
Attorney, Agent, or Firm—Woodard, Weikart, Emhardt & Naughton

[57] ABSTRACT

An attachment mountable to a tool for operating fluid actuable tool accessories. The attachment has a main body with a plurality of chambers in which a plurality of pistons are slidably mounted. Each chamber has an inlet and an outlet with each piston having a seal engageable with a chamber seat to control the flow of fluid from the inlet to the outlet. The head of each piston extends externally from the body and is contactable by a slide movable against the body. The slide is connected to the spindle sleeve of the tool and is movable in unison with the cutter to and from the work piece. The slide by contacting the piston heads forces the piston seals away from the chamber seats thereby allowing fluid flow from the chamber inlets to the chamber outlets which are connected to the tool accessories.

9 Claims, 5 Drawing Figures

3,794,434

ATTACHMENT FOR OPERATING TOOL ACCESSORIES

BACKGROUND OF THE INVENTION

1. Field of the Invention

This invention is in the field of accessories for tools.

2. Description of the Prior Art

Complicated expensive machinery are provided with pneumatic accessories for performing various tasks on the work piece such as for clamping the work piece. The small relatively inexpensive tools such as a hand operated electric drill press typically are not provided with these automatic accessories and as a result extra operator time is required to perform tasks such as the clamping and unclamping of the work piece, the application of coolant to the work piece and the application of forced air to the work piece to remove the bits of material cut therefrom. Disclosed herein is an attachment which is readily mountable to many of these existing small tools in a relatively quick and easy manner thereby allowing for the automatic control of the various accessories of the tool.

SUMMARY OF THE INVENTION

One embodiment of the present invention is an attachment mountable to a tool having a cutter and means simultaneously movable with the cutter to and from the work piece, the attachment for operating fluid actuable accessories of the tool comprising an enclosure mountable to the tool defining a chamber with a fluid input, a fluid output and a sealing seat, the output being connectable to at least one of the accessories, a guide positioned adjacent the enclosure, a piston slidably mounted within the chamber and having a seal seatable on the seat to prevent fluid flow from the input to the output, the piston having a portion extendable into the guide, a slide movable through the guide and against the portion moving the portion into the enclosure and moving the seal with respect to the seat to control fluid flow from the input to the output, and, a rigid member upon which the slide is mounted, the member is connectable to the means so the slide and means move in unison.

It is an object of the present invention to provide an attachment mountable to a tool which will automatically control various accessories of the tool.

It is a further object of the present invention to provide new and improved means for controlling accessories such as work piece clamps for a hand operable electric drill press.

Related objects and advantages of the present invention will be apparent from the following description.

DESCRIPTION OF THE PREFERRED EMBODIMENT

Figure 1:
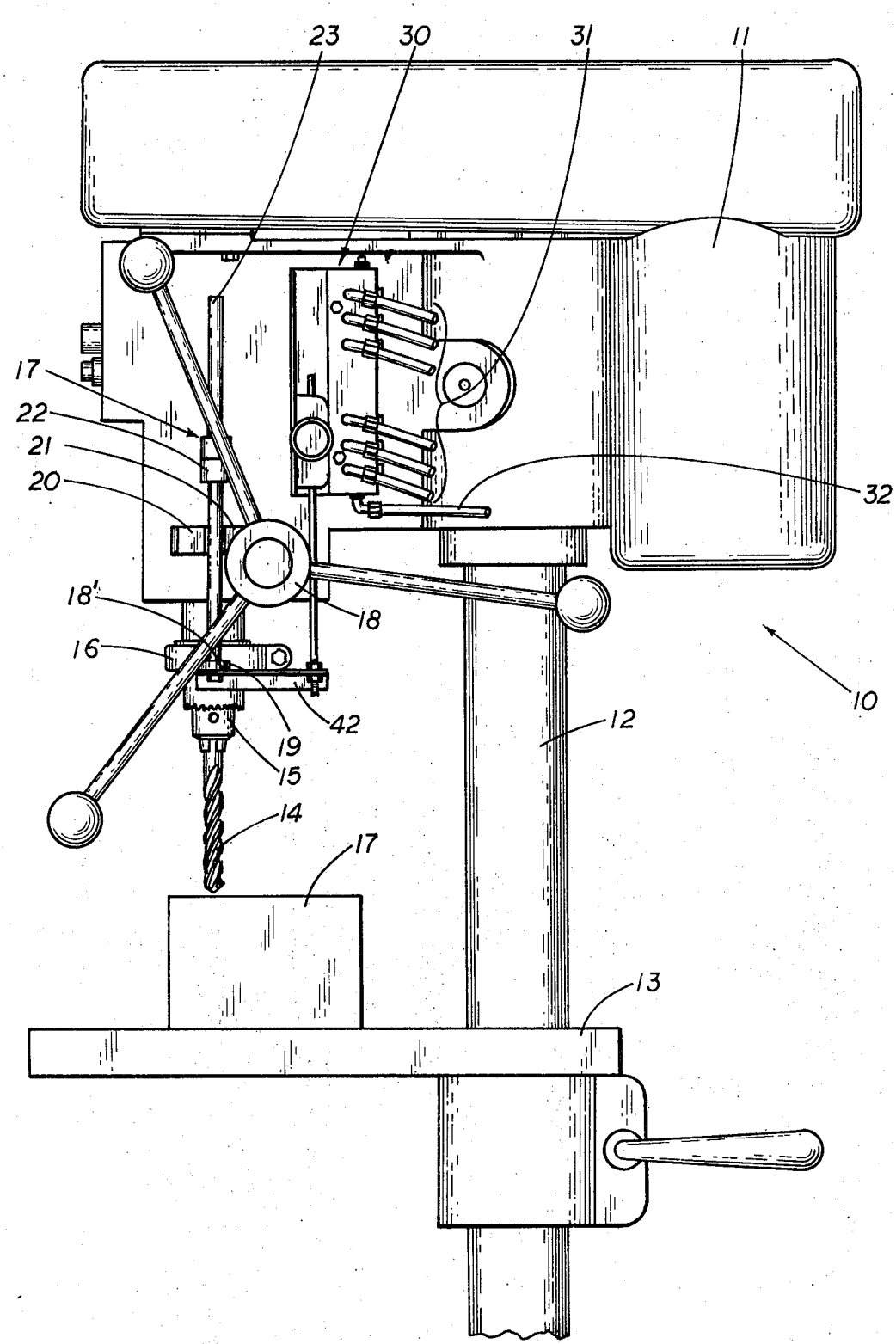
FIG. 1 is a fragmentary side view of a drill press which has mounted thereon an attachment incorporating the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a drill press 10 which includes a cabinet 11 mounted atop a support rod 12 which extends upwardly from base 13. A drill 14 is removably mounted to a rotatable spindle 15 which is suspendedly mounted from a sleeve 16 movable downward towards the work piece 17 atop base 13. Included within cabinet 11 is a driving means such as an electric motor connected by pulleys and belts to a mechanism for rotating spindle 15 and drill 14. A handle assembly 18 is rotatably mounted to cabinet 11 and may be rotated to force the drill 14 to and from the work piece. Handle assemblies 18 typically include a gear which is in meshing engagement with a rack attached to sleeve 16. These drill presses are quite well known and thus further elaboration thereon would be superfluous. Such drill presses are produced by Sears Roebuck & Company under the trademark "Craftsman." A model very similar to that shown in FIG. 1 is the Sears Roebuck Model No. 2458.

A depth gauge 17 has a bottom end 18' which is mounted atop flange 19 of sleeve 16. Depth gauge 17 includes an elongated member 23 which extends upwardly through a pair of flanges 20 and 21 secured to cabinet 11. An enlarged member 22 is threadedly mounted onto the elongated member so as to contact flanges 20 and 21 as drill 14 is moved downwardly by handle assembly 18. Enlarged member 22 may be adjusted to any location on the elongated member 23 thereby allowing the operator to exactly control the amount of downward movement of the drill.

The attachment 30 incorporating the present invention is mounted to cabinet 11 for operating various fluid actuable accessories of the tool. Attachment 30 includes a plurality of pistons which control the amount of air flow from a source of pressurized air to the tool accessories. Tool accessories may include clamps for holding the work piece, a coolant spraying device, an air blower for blowing away particles of material cut by the drill and other similar types of accessories. Air tubes 31 are connected to the accessories whereas air tube 32 is connected to the source of pressurized air.

Figure 2:
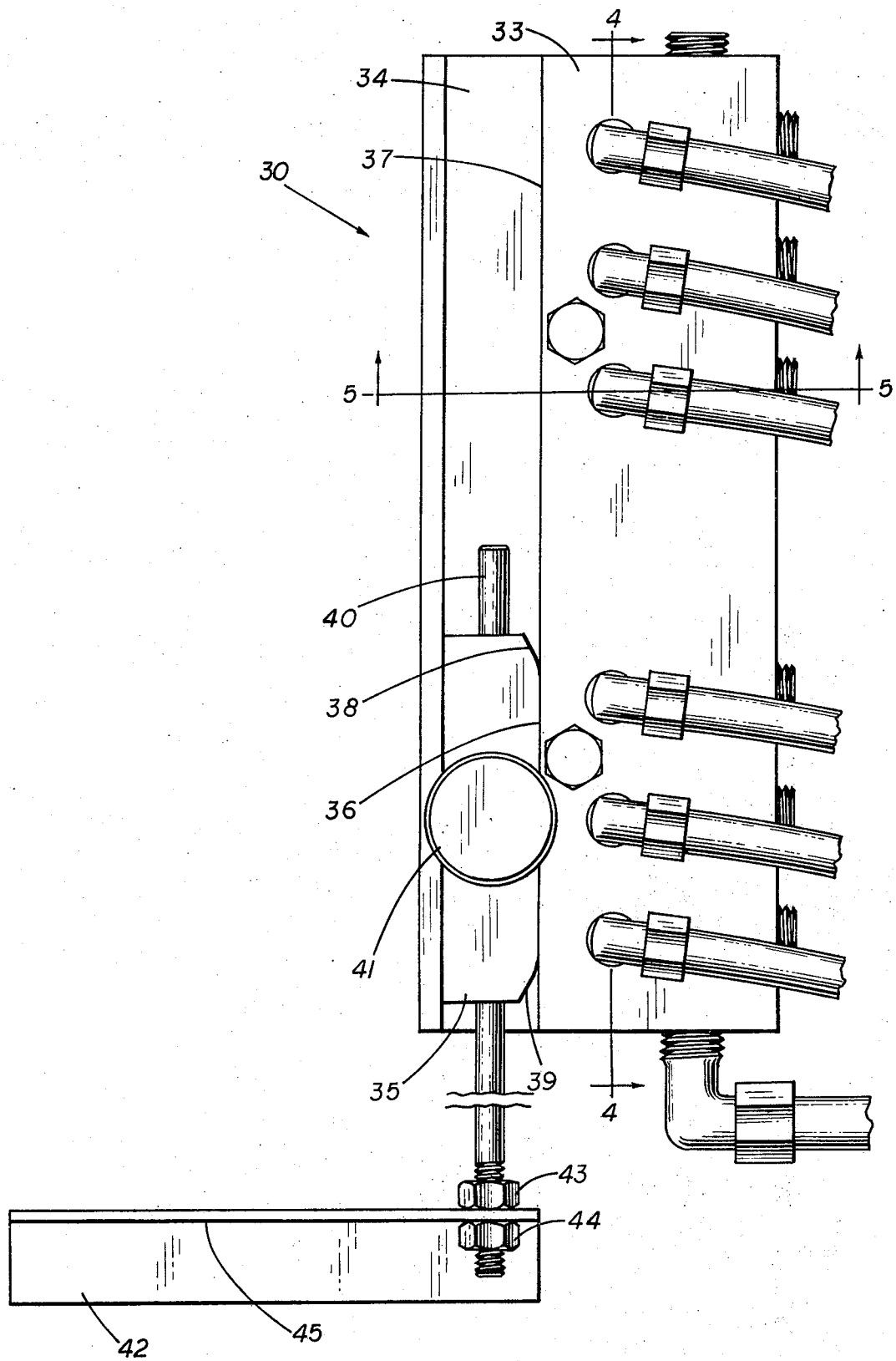
FIG. 2 is a fragmentary enlarged view of the attachment of FIG. 1.

Referring now to FIG. 2, accessory 30 includes an enclosure or main body 33 which is provided with a channel 34 through which slide 35 moves. Slide 35 has a flat surface 36 adjacent side 37 of channel 34. In addition, slide 35 has a top beveled edge 38 and a bottom beveled edge 39. Slide 35 includes a hole which extends through its length with rod 40 extending therethrough. An adjustable threaded member 41 is threaded to slide 35 and extends into the hole receiving rod 40.

Threaded member 41 may be rotated so as to extend into the hole thereby abutting against rod 40. The slide may therefore be moved to any location on rod 40 and located thereat by the threaded member. The bottom end of rod 40 extends through and is connected to rigid member 42. The pair of nuts 43 and 44 are threadedly received by rod 40 with wall 45 of member 42 positioned between the nuts. The opposite end of member 42 is connected to depth control gauge 17 so that the gauge and slide move in unison. A number of ways may be used to secure member 42 to gauge 17. For example, a bolt which is threadedly received into flange 19 may be used to mount member 42 to flange 19. Another method would be to have the bottom end of member 23 extend through flange 19, wall 45 and then received by a hexagonally shaped nut.

Figure 3:
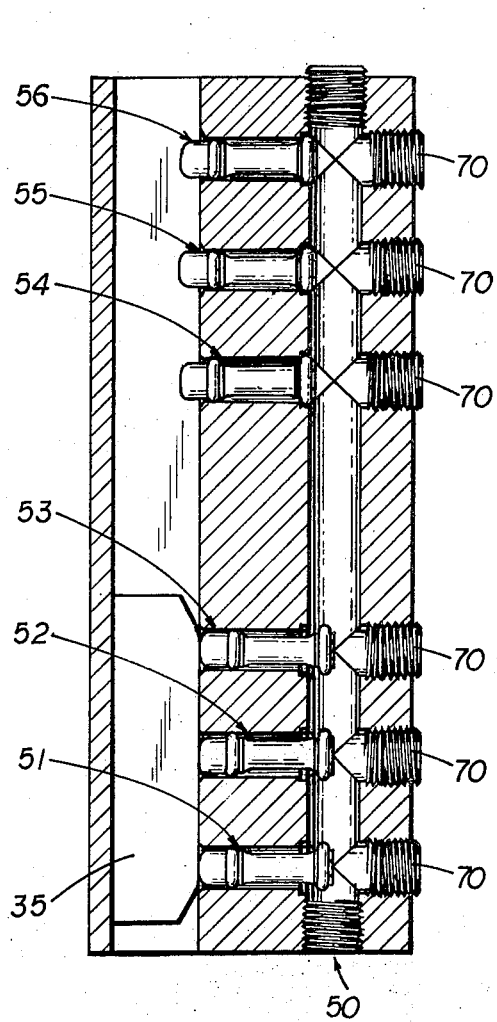
FIG. 3 is a cross sectional view taken along the line 3—3 of FIG. 4 and viewed in the direction of the arrows.
Figure 4:
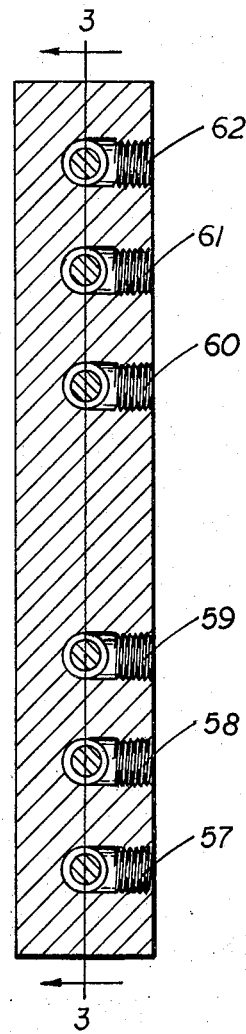
FIG. 4 is a cross sectional view on a reduced scale taken along the line 4—4 of FIG. 2 and viewed in the direction of the arrows.
Figure 5:
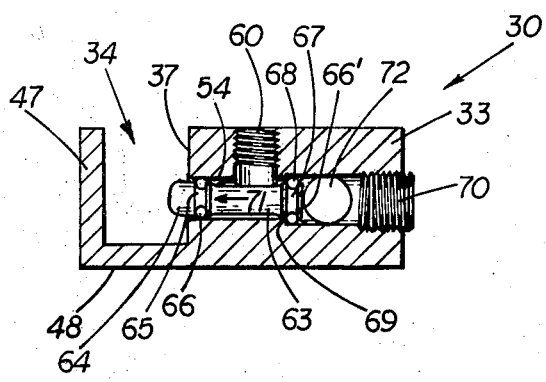
FIG. 5 is a cross sectional view on a reduced scale taken along the line 5—5 of FIG. 2 and viewed in the direction of the arrows.

The main body 33 of attachment 30 is in the form of an elongated block which is integrally attached by wall 48 to an upstanding flange 47 which is spaced apart from the block so as to form channel 34 adjacent to side 37. The input and output couplings have been removed from block 33 in FIGS. 3 through 5 for sake of clarity. The fluid input port 50 is in communication with a plurality of inner chambers 51 through 56 thereby providing for the interconnection between the chambers. The input coupling threadedly received by the block is connected to a suitable source of pressurized fluid such as air. Chambers 51 through 56 have fluid outlets 57 through 62 respectively. The fluid outlet couplings are threadedly received by the block and are connected to the various accessories of the tool. A piston is slidably mounted in each chamber and is movable to control the flow of fluid from the inlet to each outlet. Piston 63 which is within chamber 54 will now be described it being understood that a similar description applies to the other pistons and chambers. Piston 63 has a head 64 which is provided with a groove 65 in which O-ring 66 is mounted. The O-ring 66 is in sealing engagement with the walls of chamber 54 during movement of the piston. The O-ring 66 is not in sealing engagement with the walls of chamber 54 whenever O-ring 68 is seated on seat 69 thereby allowing pressure from outlet 60 to escape and to be reduced to zero providing a three way valve operation. Piston 63 has an enlarged rear portion 66' which is also provided with a groove 67 in which O-ring 68 is mounted. The portion of the piston between ends 64 and 66' is of a reduced diameter so as to allow the flow of fluid from inlet 50 through chamber 54 and out through outlet 60 whenever a source of pressurized fluid is applied to inlet 50 with O-ring 68 spaced apart from seat 69. Each piston has a length from O-ring 66 to O-ring 68 which is not greater than the distance between each chamber seat 69 and side 37. As a result, when fluid pressure is applied to inlet 50 thereby forcing the piston in the direction of arrow 71, O-ring 66 is still engaged with the side walls of chamber 54 thereby preventing accidental loss of pressure. Each chamber is in communication with another chamber via hole 72 (FIG. 5) which is plugged at one end and connected at its opposite end to the source of pressurized fluid. Each chamber 51–56 has an enlarged portion in which each end 66' is positioned. The enlarged chamber portions are sealed at one end by plugs 70. In certain cases, when the source of pressure is not sufficiently great to move the piston, it is desirable to place a helical spring in the enlarged portion of each chamber so as to urge each piston in the direction of arrow 71. Thus, the increment of pressure added by the source of fluid pressure will thereby complete the movement of each piston so as to force the O-rings 68 to sealingly contact seats 69. Each seat is positioned between the input and each output. For example, seat 69 of chamber 54 is positioned between input 50 and outlet 60. O-ring 68 is positioned between the inlet 50 and outlet 60 so as to move away from seat 69 when head 64 is contacted by slide 35 and forced into the enclosure. Each chamber opens into channel 34 through side 37 so as to allow heads 64 of each piston to extend partially into the channel. The pistons and chambers are located at different locations along the length of channel 34 with slide 35 having a fixed length adjacent side 37 so as to contact only some of the heads of the pistons at any given time thereby allowing the remaining pistons to extend into the channel. Thus, the tool accessories may be easily controlled. A typical machine would have air actuable clamps holding the work piece thereby allowing opening and closing of the clamps by a pair of pistons in the attachment 30. For example, the outlet of chamber 51 could be connected to the clamps for holding the work piece. As slide 35 moved downwardly with the drill, the piston in chamber 51 would be forced further into body 33 thereby forcing its O-ring away from the seat and allowing fluid pressure to be exerted through inlet 50, chamber 51 and out through its outlet which is connected by means such as an air tube 31 to the pneumatic mechanism of the clamps thereby closing the clamps. Likewise, as the drill and slide are moved simultaneously upward, slide 35 contacts the piston within chamber 54 thereby allowing fluid pressure to be exerted through chamber 54 and out through the outlet connected by means such as an air tube to the retracting pneumatic mechanism of the clamps. Alternatively, the pneumatic mechanism of the working piece clamps could be spring loaded so as to automatically open whenever fluid pressure was removed therefrom. In this latter case, cylinder 54 would not be required.

It will be obvious from the above description that the present invention will allow a great savings of operator man hours since the accessories of the tool will automatically be controlled. While although an attachment is shown having six chambers and six pistons, the present invention includes an attachment having a number greater than or less than six chambers and six pistons. For example, the attachment may have only three chambers and three pistons. Also, while although the attachment is shown mounted to a drill press, the attachment may also be used with a variety of other tools such as a mill.

While the invention has been illustrated and described in detail in the drawings and foregoing description, the same is to be considered as illustrative and not re-strictive in character, it being understood that only the preferred embodiment has been shown and described and that all changes and modifications that come within the spirit of the invention are desired to be protected.

The invention claimed is:

1. An attachment mountable to a tool having a cutter and means simultaneously movable with said cutter to and from the work piece, said attachment for operating fluid actuable accessories of the tool comprising:
   an enclosure mountable to said tool defining a chamber with a fluid input, a fluid output and a sealing seat, said output being connectable to at least one of said accessories;

a guide positioned adjacent said enclosure;

a piston slidably mounted within said chamber and having a seal seatable on said seat to prevent fluid flow from said input to said output, said piston having a portion extendable into said guide;

a slide movable through said guide and against said portion moving said portion into said enclosure and moving said seal with respect to said seat to control fluid flow from said input to said output; and, a rigid member upon which said slide is mounted, said member is connectable to said means so said slide and means move in unison, said means is a depth gauge which is an elongated member having a bottom end secured to said rigid member and to the spindle sleeve of said tool.

2. The attachment of claim 1 wherein:

said seat is positioned between said input and said output and said seal is positioned between said seat and said input so as to move away from said seat when said portion is forced by said slide into said enclosure.

3. The attachment of claim 2 wherein:

said enclosure has a plurality of interconnected chambers with inlets, outlets and sealing seats and further comprising:

a plurality of pistons slidably mounted within said chambers and having portions extendable into said guide at different locations along the length thereof and wherein said slide has a fixed length adjacent said enclosure so as to contact only some of said portions with the remaining portions extending into said guide.

4. The attachment of claim 3 and further comprising:

a rod with a bottom end connected to said rigid member and wherein:

said slide includes a hole extending through its length with said rod extending therethrough and an adjustable threaded member extendable into said hole against said rod allowing said slide to be moved to any location on said rod and locked thereat by said threaded member.

5. The attachment of claim 4 wherein:

said enclosure is an elongated block and said guide includes a wall spaced apart from but connected to said block forming a channel adjacent one side of said block through which said slide is movable by said means.

6. The attachment of claim 5 wherein:

each chamber opens into said channel through said one side allowing the piston mounted therein to extend partially into said channel; and, said slide has a flat surface adjacent said one side with a top beveled edge and a bottom beveled edge.

7. The attachment of claim 6 wherein:

each piston has a sealed head with an O-ring mounted thereon, an enlarged rear portion upon which said seal is mounted; each piston has a reduced diameter middle portion extending between its head and rear; each piston has a length from said O-ring to said seal not greater than the distance between said chamber seat and said one side.

8. An attachment mountable to a tool having a cutter and means simultaneously movable with said cutter to and from the work piece, said attachment for operating fluid actuable accessories of the tool comprising:

an enclosure mountable to said tool defining a chamber with a fluid input, a fluid output and a sealing seat, said output being connectable to at least one of said accessories;

a guide positioned adjacent said enclosure;

a piston slidably mounted within said chamber and having a seal seatable on said seat to prevent fluid flow from said input to said output, said piston having a portion extendable into said guide;

a slide movable through said guide and against said portion moving said portion into said enclosure and moving said seal with respect to said seat to control fluid flow from said input to said output; and a rigid member upon which said slide is mounted, said member is connectable to said means so said slide and means move in unison, said means includes a member fixedly secured to said rigid member and to the spindle sleeve of said tool.

9. The attachment of claim 8 wherein:

said enclosure has a plurality of interconnected chambers with inlets, outlets and sealing seats and further comprising:

a plurality of pistons slidably mounted within said chambers and having portions extendable into said guide at different locations along the length thereof and wherein said slide has a fixed length adjacent said enclosure so as to contact only some of said portions with the remaining portions extending into said guide.

* * * * *